US012590847B2

(12) United States Patent (10) Patent No.: US 12,590,847 B2
Enomoto et al. (45) Date of Patent: Mar. 31, 2026

(54) TEMPERATURE SENSOR

(71) Applicant: SHIBAURA ELECTRONICS CO., LTD., Saitama (JP)

(72) Inventors: Masakazu Enomoto, Aomori (JP); Kouzou Fujita, Aomori (JP); Tatsuyuki Suzuki, Aomori (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 271 days.

(21) Appl. No.: 18/547,595

(22) PCT Filed: Aug. 4, 2022

(86) PCT No.: PCT/JP2022/029911
§ 371 (c)(1),
(2) Date: Aug. 23, 2023

(87) PCT Pub. No.: WO2024/029024
PCT Pub. Date: Aug. 2, 2024

(65) Prior Publication Data
US 2025/0012638 A1 Jan. 9, 2025

(51) Int. Cl.
G01K 1/143 (2021.01)
(52) U.S. Cl.
CPC .................................. G01K 1/143 (2013.01)
(58) Field of Classification Search
CPC ....................................................... G01K 1/143
USPC ........................................................ 374/208
See application file for complete search history.

(56) References Cited

U.S. PATENT DOCUMENTS

| | | | |
|---|---|---|---|
| 2007/0110124 A1 | 5/2007 | Shiraki et al. | |
| 2018/0017446 A1 | 1/2018 | Takamasa et al. | |
| 2018/0364108 A1* | 12/2018 | Tanaka | ..................... G01K 7/22 |
| 2019/0178724 A1 | 6/2019 | Yanagida et al. | |

(Continued)

FOREIGN PATENT DOCUMENTS

| | | |
|---|---|---|
| CN | 1809733 A | 4/2010 |
| CN | 107209062 A | 9/2017 |
| CN | 109313083 A | 2/2019 |

(Continued)

OTHER PUBLICATIONS

Office Action for Japanese Application No. 2023-097399 dated Sep. 5, 2023 and translation thereof.

(Continued)

*Primary Examiner* — Mirellys Jagan
(74) *Attorney, Agent, or Firm* — McDonald Hopkins LLC

(57) ABSTRACT

A temperature sensor includes a temperature measurement unit that is configured to measure a temperature of a measurement object, the temperature measurement unit having a heat-sensitive body and a pair of electric wires electrically connected to the heat-sensitive body; a holding portion that holds the temperature measurement unit and is composed of a single member; and an elastic portion that applies an elastic force to the temperature measurement unit toward the measurement object, the elastic portion being provided between the temperature measurement unit and the holding portion. The electric wires of the temperature measurement unit are pulled out from the holding portion along a first direction in which the elastic force is applied.

6 Claims, 7 Drawing Sheets

(56)                    References Cited

U.S. PATENT DOCUMENTS

| | | | | |
|---|---|---|---|---|
| 2020/0014083 | A1* | 1/2020 | Matsushima | ........... G01K 1/14 |
| 2022/0320971 | A1 | 10/2022 | Akaba et al. | |

FOREIGN PATENT DOCUMENTS

| | | | | |
|---|---|---|---|---|
| CN | 113950616 | A | | 1/2022 |
| JP | S5588132 | U | | 6/1980 |
| JP | S59134029 | U | | 9/1984 |
| JP | H1123378 | A | | 1/1999 |
| JP | 2013029482 | A | | 2/2013 |
| JP | 2013137233 | A | * | 7/2013 |
| JP | 2016050882 | A | | 4/2016 |
| WO | WO-2017135076 | A1 | * | 8/2017 ......... H01M 10/425 |

OTHER PUBLICATIONS

International Search Report for PCT/JP2022/029911 dated Oct. 25, 2022.
Written Opinion for PCT/JP2022/029911 dated Oct. 25, 2022.
State Intellectual Property Office of People's Republic of China, Notification of First Office Action for Application No. 202280009182.1 report issue date Aug. 30, 2025 China.

\* cited by examiner

STEP1

STEP2

TEMPERATURE SENSOR

CROSS-REFERENCE TO RELATED APPLICATIONS

This is the National Stage of PCT international application PCT/JP2022/029911 filed on Aug. 4, 2022, the content of which is incorporated herein by reference in its entirety.

TECHNICAL FIELD

The present invention relates to a temperature sensor capable of measuring the temperature of a measurement object that may vibrate.

BACKGROUND ART

A temperature sensor measures the temperature of a wide variety of measurement objects. An example of the measurement objects is a storage battery (battery) mounted on a vehicle such as an electric vehicle. Since the battery vibrates as the vehicle travels, a temperature sensor, for which the battery is a measurement object, is equipped with countermeasures against vibration. As an example of countermeasures, Patent Literature 1 proposes holding a temperature measurement unit including a thermistor of a temperature sensor by means of a compression coil spring, which is an elastic body. According to the temperature sensor of Patent Literature 1, in which the temperature measurement unit is elastically held by the compression coil spring, even when the battery vibrates, the temperature measurement unit is displaced due to the vibrating battery such that the temperature measurement unit can maintain contact with the battery, so as to be able to accurately measure the temperature of a measurement object that may vibrate.

CITATION LIST

Patent Literature

Patent Literature 1: JP 2016-50882 A

SUMMARY OF INVENTION

Technical Problem

In order to accurately measure the temperature of a measurement object that may vibrate, it is preferable not to apply a force in a direction different from displacement direction of the temperature measurement unit. For example, when a force is applied in a direction orthogonal to the displacement direction, the temperature measurement unit may tilt with respect to the measurement object. In the temperature sensor of Patent Literature 1, terminals and lead wires connected to the thermistor of the temperature measurement unit are pulled out in a direction perpendicular to the direction in which the temperature measurement unit is displaced. Therefore, when a tensile force is applied to the lead wires, a force in a direction different from the displacement direction is applied to the temperature measurement unit, causing the temperature measurement unit to tilt from the displacement direction, such that an ideal contact state between the temperature measurement unit and the measurement object cannot be obtained. This is a factor that degrades the accuracy of the temperature measurement of the measurement object. Therefore, an object of the present invention is to suppress application of a force from a direction different from a displacement direction and to ensure positional accuracy of a temperature measurement unit in a temperature sensor that movably holds the temperature measurement unit by means of an elastic body.

Solution to Problem

A temperature sensor of the present invention includes a temperature measurement unit that is configured to measure a temperature of a measurement object, the temperature measurement unit having a heat-sensitive body and electric wires electrically connected to the heat-sensitive body; a holding portion that holds the temperature measurement unit and is composed of a single member; and an elastic part that applies an elastic force to the temperature measurement unit toward the measurement object, the elastic part being provided between the temperature measurement unit and the holding portion. In the present invention, the electric wires of the temperature measurement unit are pulled out from the holding portion along a first direction in which the elastic force is applied.

The holding portion of a preferred aspect of the present invention includes an accommodation portion that accommodates the elastic part and is open in a second direction that intersects the first direction in which the elastic force is applied.

The holding portion of the preferred aspect of the present invention includes a locking body that locks the electric wires.

The holding portion of the preferred aspect of the present invention includes a guide that is configured to guide displacement of the temperature measurement unit due to vibration of the measurement object.

The elastic part of the preferred aspect of the present invention is composed of a compression coil spring, and the electric wires are pulled out from the holding portion through a central empty space of the compression coil spring.

The temperature measurement unit of the preferred aspect of the present invention includes a protective tube that accommodates the heat-sensitive body and has a heat-sensitive surface in contact with the measurement object. The heat-sensitive surface is rectangular in plan view.

The protective tube of the preferred aspect of the present invention has a rectangular tube shape.

The holding portion of the preferred aspect of the present invention includes an attachment assurance body that ensures completion of attachment to the measurement object.

Advantageous Effects of Invention

According to the temperature sensor of the present invention, in the temperature sensor in which the elastic body holds the temperature measurement unit displaceably, the electric wires of the temperature measurement unit are pulled out from the holding portion along the first direction in which the elastic force is applied. As a result, the temperature measurement accuracy of the measurement object is ensured by suppressing the force applied to the temperature measurement unit from a direction different from the displacement direction.

BRIEF DESCRIPTION OF DRAWINGS

FIG. 1A is a front view, FIG. 1B is a side view, and FIG. 1C is a top view.

FIG. 2A is a partial perspective view from below, FIG. 2B is a side cross-sectional perspective view, and FIG. 2C is a diagram comparing the shapes of heat-sensitive surfaces.

FIG. 3A is a side cross-sectional view and FIG. 3B is a partially enlarged cross-sectional view thereof.

DESCRIPTION OF EMBODIMENT

For a temperature sensor 1 according to a preferred embodiment of the present invention, one example of the measurement object OM is a battery mounted on an electric vehicle. This measurement object OM installed in an electric vehicle may experience vibration during travel. In response to this vibration of the measurement object OM, the temperature sensor 1 uses a compression coil spring CS, which is an elastic body, to press a temperature measurement unit 10 against the measurement object OM. In the temperature sensor 1, lead wires 27 of the temperature measurement unit 10 are pulled out along a direction (first direction) in which a load is received from the compression coil spring CS.

Further, the temperature sensor 1 holds the temperature measurement unit 10 with a holding unit 40 that is a single member, allowing for displacement of it along the first direction. This displacement occurs due to the vibration of the measurement object OM.

Meeting the aforementioned conditions enables the temperature sensor 1 to measure, with accuracy, the temperature of the measurement object OM.

Specific details of the temperature sensor 1 will be described below with reference to the drawings.

[Overall Configuration of Temperature Sensor 1: FIGS. 1A to 1C, FIGS. 2A and 2B]

Figures 1A, 1B:
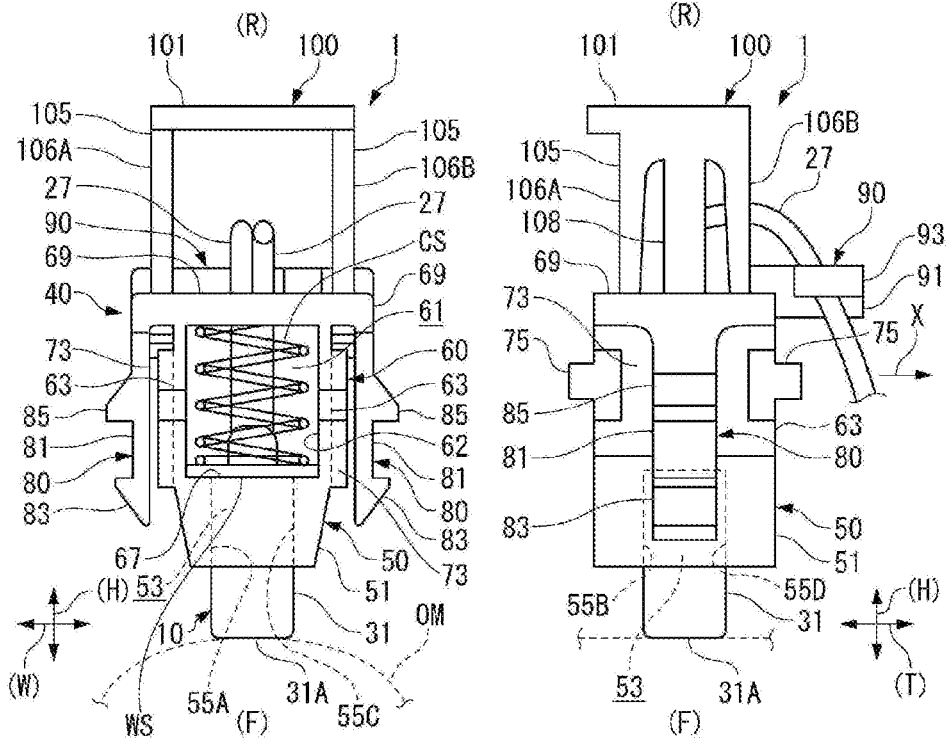
FIGS. 1A to 1C illustrate a temperature sensor according to an embodiment, where
Figure 1C:
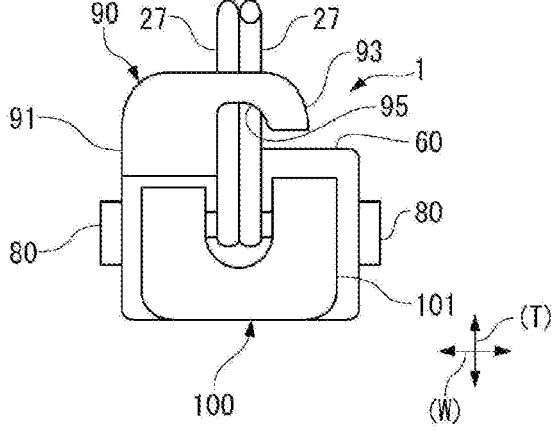

The temperature sensor 1 includes the temperature measurement unit t 10 responsible for measuring the temperature of the measurement object OM, a compression coil spring CS which is an elastic part for applying an elastic force to the temperature measurement unit 10 toward the object of measurement OM, a holding unit 40 holding the temperature measurement unit 10, and an attachment assurance body 100. The configuration of the temperature measurement unit 10, the holding unit 40, and the attachment assurance body 100 will be described in this order. Here, for convenience of description of the temperature sensor 1, a height direction (H), a width direction (W), and a thickness direction (T) are defined as illustrated in FIGS. 1A to 1C, etc. Also, the height direction (H) corresponds to the first direction, and the thickness direction (T) or the width direction (W) corresponds to a second direction. A side on which a heat-sensitive surface 31A of a protective tube 31 is provided is defined as the front (F), and the opposite side is defined as the rear (R), and these definitions are relative.

Figure 3A:
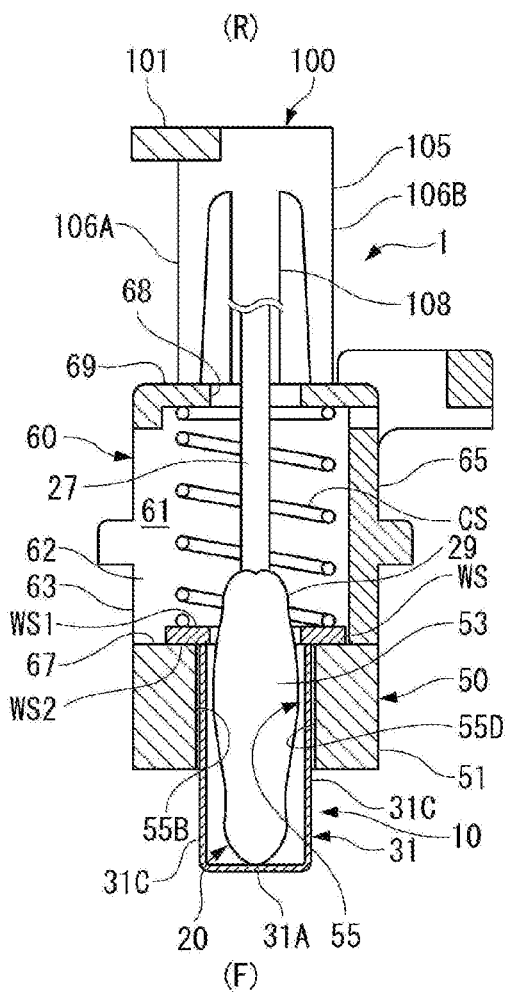
FIGS. 3A and 3B illustrate the temperature sensor according to the embodiment, where
Figure 3B:
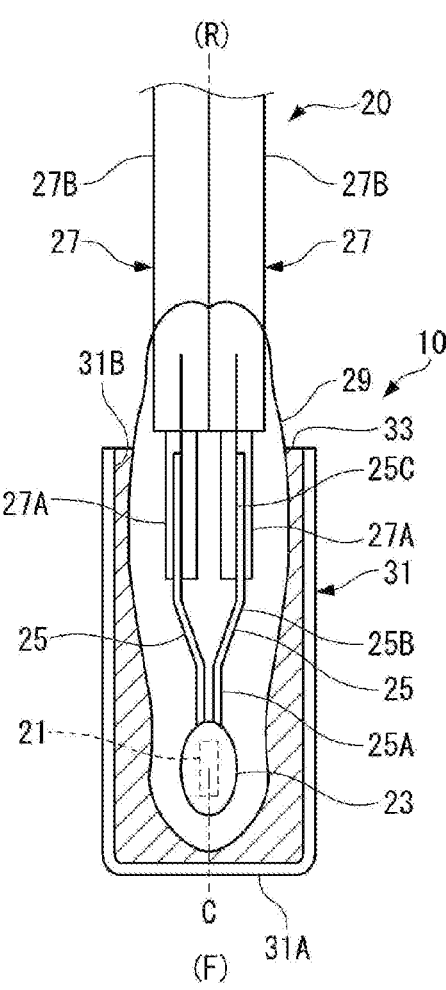
Figure 3B:
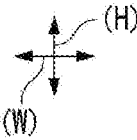

[Temperature Measurement Unit 10: FIGS. 3A and 3B]

The temperature measurement unit 10 includes a sensor element 20, the protective tube 31 made of metal that accommodates a main part of the sensor element 20, and a filler 33 that fills a space between the sensor element 20 and the protective tube 31.

[Sensor Element 20: FIG. 3B]

The sensor element 20 includes a heat-sensitive body 21, a protective layer 23 made of glass covering the periphery of the heat-sensitive body 21, a pair of extension wires 25 and 25, electrically connected to the heat-sensitive body 21, and a pair of lead wires 27 and 27 electrically connected to the pair of extension wires 25 and 25, respectively. The sensor element 20 also includes a coating layer 29 covering the protective layer 23 and the lead wires 27. The extension wires 25 and 25 and the lead wires 27 and 27, which are electrically connected respectively, form a pair of electric wires in the present invention.

[Heat-Sensitive Body 21]

The heat-sensitive body 21 preferably uses, for example, a thermistor. A thermistor is an abbreviation for thermally sensitive resistor, and is a metal oxide that measures temperature by utilizing changes in electrical resistance value according to temperature.

Thermistors are classified into negative temperature coefficient (NTC) thermistors and positive temperature coefficient (PTC) thermistors, but the present invention can use any thermistor.

As an NTC thermistor, an oxide sintered body having the basic composition of manganese oxide ($Mn_3O_4$) having a typical spinel structure can be used for the heat-sensitive body 21. An oxide sintered body having the composition of $MxMn_{3-x}O_4$ in which element M (one or more of Ni, Co, Fe, Cu, Al and Cr) is added to the aforementioned basic structure can be used as the heat-sensitive body 21. Further, one or more of V, B, Ba, Bi, Ca, La, Sb, Sr, Ti, and Zr can be added.

In addition, as a PTC thermistor, a compound oxide having a typical perovskite structure, for example, an oxide sintered body having $YCrO_3$ as a basic structure can be used for the heat-sensitive body 21.

[Protective Layer 23]

As illustrated in FIG. 3B, the protective layer 23 made of glass hermetically seals the heat-sensitive body 21 and keeps it airtight, thereby preventing chemical and physical changes in the heat-sensitive body 21 due to environmental conditions, and protecting the heat-sensitive body 21 mechanically. The protective layer 23 made of glass covers the front (F) of the extension wire 25 in addition to the entire heat-sensitive body 21 and seals the extension wire 25. The provision of the protective layer 23 is optional in the present invention.

[Extension Wire 25]

A pair of extension wires 25 and 25 are electrically connected to electrodes (not illustrated) of the heat-sensitive body 21.

Since the extension wires 25 are sealed by the protective layer 23, a dumet wire having a linear expansion coefficient similar to that of glass is used. The dumet wire is a conductor wire that uses an alloy of which the main components are iron and nickel as a conductor (core wire) and is covered with copper. Each of the extension wires 25 is sealed with a coating layer 29 because the conductor is exposed and there is a risk of short-circuiting if moisture enters therein.

As illustrated in FIG. 3B, the pair of extension wires 25 and 25 has a first region 25A in which the extension wires 25 and 25 are connected to the heat-sensitive body 21 and have a narrow interval therebetween, and a third region 25C in which the extension wires 25 and 25 are respectively connected to the pair of lead wires 27 and 27, and have a wide interval therebetween. In order to set the interval between the first region 25A and the third region 25C, the pair of extension wires 25 and 25 has a second region 25B with an interval continuously widening between the first region 25A and the third region 25C.

[Lead Wire 27]

Each of the lead wires 27 includes a core wire 27A made of a conductor and an insulation coating 27B covering the core wire 27A. The lead wire 27 is electrically connected to the extension wire 25 at the core wire 27A by welding, soldering, a conductive adhesive, or the like.

[Coating Layer 29]

As illustrated in FIGS. 3A and 3B, the sensor element 20 includes a coating layer 29 made of an electrically insulating resin material such as epoxy resin. The coating layer 29 functions as an electrical insulator for the protective layer 23, the extension wires 25, and the lead wires 27. In addition, the coating layer 29 functions as a bonding layer that adheres to a filler 33, which will be described below. The coating layer 29 can be formed by dipping the heat-sensitive body 21 (protective layer 23) side into a liquid resin material such as epoxy resin. The coating layer 29 covers an area at a predetermined position of an insulating coating 27B of the lead wires 27 from a front end of the protective layer 23 of the heat-sensitive body 21. The resin material forming the coating layer 29 is interposed between both pairs of the extension wires 25 and the core wires 27*a* of the lead wires 27, thereby ensuring electrical insulation between the extension wires 25 and between the core wires 27A.

[Protective Tube 31]

As illustrated in FIGS. 3A and 3B, the protective tube 31 is a metallic member that covers the sensor element 20 from its front end to the lead wires 27, and is typically made of aluminum, aluminum alloy, copper, copper alloy, or the like. The protective tube 31 is made of a metal material with excellent thermal conductivity in order to quickly transmit the ambient temperature to the inside, while protecting the sensor element 20 accommodated inside from the ambient atmosphere.

The protective tube 31 is composed of a rectangular tube shaped member, which includes one closed end serving as a heat-sensitive surface 31A, and an open end 31B at the other end. The heat-sensitive surface 31A is formed in a rectangular shape. The protective tube 31 has the heat-sensitive surface 31A located on the front (F) and the open end 31B located on the rear (R), and supports the sensor element 20 via the filler 33 therein.

Four side surfaces of the protective tube 31 are guide surfaces 31C. These guide surfaces 31C slide along a guide 50 of the holding unit 40, which will be described below. Each guide surface 31C is composed of, for example, a flat surface.

[Filler 33: FIGS. 3A and 3B]

The filler 33 supports the sensor element 20 inside the protective tube 31 by filling the space between the sensor element 20 and the protective tube 31.

Similar to the coating layer 29, the filler 33 is made of a resin material with electrical insulation, such as epoxy resin. The filler 33 is bonded to the coating layer 29 of the sensor element 20 with a strong adhesive force, and is also bonded to an inner wall of the protective tube 31 with an adhesive force.

The filler 33 and the coating layer 29 have in common that epoxy resin is used. Considering that the main purpose of the filler 33 is to conduct heat from the surrounding temperature toward the heat-sensitive body 21, a material with h higher thermal conductivity than the coating layer 29 is used. On the other hand, as for the coating layer 29, a material that can be suitably dipped is used.

Enclosing the sensor element 20 formed up to the coating layer 29 in the protective tube 31 follows the procedure below.

A predetermined amount of liquid epoxy resin, which will form the filler 33 after solidification, is put into the inside of the protective tube 31 with the open end 31B facing upward. The sensor element 20 having the coating layer 29 is inserted from the open end 31B into the protective tube 31 with the epoxy resin therein. When the epoxy resin inside the protective tube 31 is solidified, the temperature measurement unit 10 is obtained.

[Compression Coil Spring CS: FIG. 1A, FIGS. 2A to 2C, FIGS. 3A and 3B]

The compression coil spring CS forms an elastic part that applies an elastic force to the temperature measurement unit 10 and presses it against the measurement object OM. This compression coil spring CS is accommodated in an empty space 61, which will be described below, formed in the holding unit 40. The compression coil spring CS is arranged such that its front (F) end portion in the height direction (H) is locked to the rear (R) end portion of the protective tube 31 via a washer WS described below, and its rear (R) end portion abuts a front (F) surface of an upper wall 69.

In addition, although the case where the compression coil spring CS is used as the elastic body is illustrated in the present embodiment, the present invention is not limited to this. An object or material capable of applying an elastic force toward the front (F) in the height direction (H) to the temperature measurement unit 10, such as a leaf spring or elastomer resin, may be used.

[Holding Unit 40: FIGS. 1A to 1C, FIGS. 2A and 2B]

The holding unit 40 is integrally formed by, for example, injection molding a resin material. That is, the holding unit 40 is constructed from a single member.

The holding unit 40 includes the guide 50 for guiding the displacement of the protective tube 31 of the sensor element 20, an accommodation portion 60 that accommodates the compression coil spring CS which applies an elastic force to the protective tube 31, a PA insertion path 73 through which the attachment assurance body 100, which will be described below, is inserted, a locking arm 80 for attaching the holding unit 40 to an attachment target 120, and a locking body 90 for locking the lead wires 27 and 27 of the sensor element 20.

[Guide 50: FIG. 1A, FIGS. 2A and 2B, FIGS. 3A and 3B]

The guide 50 includes a guide block 51 having an inverted pyramidal trapezoid shape in the height (H) direction, a guide path 53 extending along the height direction (H) of the guide block 51, and four guide surfaces 55 which are formed by inner wall surfaces of the guide block 51 and partition the guide path 53. The guide path 53 is a through-hole that passes through the guide block 51 in the height direction (H), and corresponds to the rectangular tube shaped appearance of the protective tube 31, such that it includes, for example, a rectangular parallelepiped space. The guide surfaces 55 are arranged around the guide path 53. The guide surfaces 55 are composed of a first guide surface 55A, a second guide surface 55B, a third guide surface 55C, and a fourth guide surface 55D. The first guide surface 55A and the third guide surface 55C face each other, and the second guide surface 55B and the fourth guide surface 55D face each other. Adjacent guide surfaces of these guide surfaces are orthogonal to each other. For example, the first guide surface 55A and the second guide surface 55B, the third guide surface 55C and the fourth guide surface 55D are orthogonal. The guide surfaces 55 extend along the height direction (H). The guide path 53 and the guide surface 55 are dimensioned in their width (W) and thickness (T) directions to enable the protective tube 31 to smoothly slide in the height direction (H) while restricting movement in the width direction (W) and thickness direction (T).

[Accommodation Portion 60: FIG. 1A, FIGS. 2A and 2B, FIGS. 3A and 3B]

An accommodation portion 60 is for accommodating and holding the compression coil spring CS, and is provided adjacent to the guide block 51 so as to be located closer to the rear (R) side than the guide block 51.

The accommodation portion 60 is composed of a pair of first side walls 63 and 63, a second side wall 65, a bottom wall 67, and the upper wall 69. The empty space 61 formed inside these walls accommodates the compression coil spring CS.

The pair of first side walls 63 and 63 are provided on both sides of the accommodation portion 60 in the width direction (W) with a space therebetween.

The accommodation portion 60 is open at one end in the thickness direction (T) to form an insertion port 62 for inserting the compression coil spring CS into the empty space 61, and the accommodation portion 60 is provided with the second side wall 65 at the other end in the thickness direction (T).

The bottom wall 67 that also serves as a part of the guide block 51 is provided at the front (F), which is one side in the height direction (H) of the accommodation portion 60, and the upper wall 69 is provided at the rear (R), which is the other side in the height direction (H).

The pair of first side walls 63 and 63 and the second side wall 65 rise from the bottom wall 67 toward the rear (R) in the height direction (H), and the rear (R) end portions of the pair of first side walls 63 and 63 and the second side wall 65 are connected to the upper wall 69.

The upper wall 69 is provided with a lead wire insertion path 68 through which the lead wires 27 of the sensor element 20 are pulled out toward the rear (R). The lead wire insertion path 68 is formed as a through hole that penetrates the upper wall 69 in the height direction (H) from the front and back. The lead wire insertion path 68 is, for example, substantially circular in plan view, and its diameter is set to be at least larger than the diameter of the lead wires 27 passing through the lead wire insertion path 68. The lead wires 27 pulled out toward the rear (R) from the lead wire insertion path 68 are folded halfway and locked by the locking body 90 which will be described below. Thereby, the protective tube 31 connected to the lead wires 27 is arranged in the guide path 53 of the guide 50.

The bottom wall 67 is formed and connected to the rear (R) of the guide 50 in the height direction (H). That is, the bottom wall 67 has an opening at a rear (R) end portion in the height direction (H) of the guide path 53 through which the protective tube 31 is inserted. As described above, since the guide path 53 is formed in a rectangular parallelepiped space, this opening is formed in a shape similar to the cross-sectional shape of the protective tube 31.

The empty space 61 of the accommodation portion 60 accommodates the compression coil spring CS and the washer WS.

The washer WS is placed on the bottom wall 67. The washer WS is, for example, an annular metal member formed in a flat plate shape. A front surface WS1 of the washer WS supports a front (F) end portion of the compression coil spring CS, and a rear surface WS2 thereof abuts a rear (R) end portion of the protective tube 31. Therefore, a compressive elastic force of the compression coil spring CS is applied to the protective tube 31 via the washer WS. This elastic force is applied to the front (F) from the position of the washer WS.

By applying the elastic force to the protective tube 31 via the washer WS in this way, for example, a load directed to the rear (R) is applied to the protective tube 31, so even if displacement of the protective tube 31 toward the rear (R) is attempted, the elastic force of the compression coil spring CS restricts the displacement toward the rear (R).

[PA Insertion Path 73]

The holding unit 40 is provided with the PA insertion path 73 through which the attachment assurance body 100 is inserted. The PA insertion path 73 is for attaching the attachment assurance body 100, which will be described below, to the holding unit 40, and the combination of this PA insertion path 73 and the attachment assurance body 100 forms an example of an attachment assurance function of the present invention. In the present embodiment, as a preferred form, the pair of PA insertion paths 73 and 73 are respectively provided on both outer sides of the pair of first side walls 63 and 63 of the accommodation portion 60 in the width direction (W). That is, each of the PA insertion paths 73 and 73 is formed between the first side wall 63 of the accommodation portion 60 and the locking arm 80, which will be described below. Each of the PA insertion paths 73 and 73 penetrates the front and back of the upper wall 69 in the height direction (H) and extends toward the front (F).

Facing the PA insertion paths 73 and 73, PA guide portions 75 and 75 for guiding insertion of the attachment assurance body 100 are respectively provided on both sides in the thickness direction (T). The PA guide portions 75 and 75 are provided to protrude from the first side walls 63 outward in the thickness direction (T).

[Locking Arm 80: FIGS. 1A and 1B, FIGS. 2A to 2C]

A pair of locking arms 80 and 80 are for fixing the temperature sensor 1 to the measurement object OM. As an example, the pair of locking arms 80 and 80 are formed so as to respectively protrude toward the front (F) from both ends of the upper wall 69 in the width direction (W). The pair of locking arms 80 and 80 are respectively provided with predetermined gaps in the width direction (W) from the pair of first side walls 63 and 63. Each locking arm 80 has an arm 81 with a cantilever shape which is formed with a predetermined dimension along the thickness direction (T). In each arm 81, a rear (R) end portion along the height direction (H) forms a fixed end connected to the upper wall 69 and a front (F) end portion forms a free end. The arm 81 is provided with a first locking claw 83 located on the front (F) and a second locking claw 85 located on the rear (R). The first locking claw 83 and the second locking claw 85 protrude outward in the width direction (W) with respect to the accommodation portion 60. When a load is applied to the first locking claw 83 or the second locking claw 85 toward the inner accommodation portion 60, the arm 81 bends in that direction.

In this embodiment, the pair of locking arms 80, 80 are provided as means for attaching the holding unit 40 to the attachment target 120, but the present invention is not limited to this. As long as the holding unit 40 can be attached to and fixed to the attachment target 120, its form and number can be set optionally. For example, only a single locking arm 80 may be required to attach the holding unit 40 to the attachment target 120.

Also, by providing a structure corresponding to the locking arm 80 on the attachment target 120 side, the provision of the locking arm 80 in the holding unit 40 may be omitted.

Figures 2A, 2B:
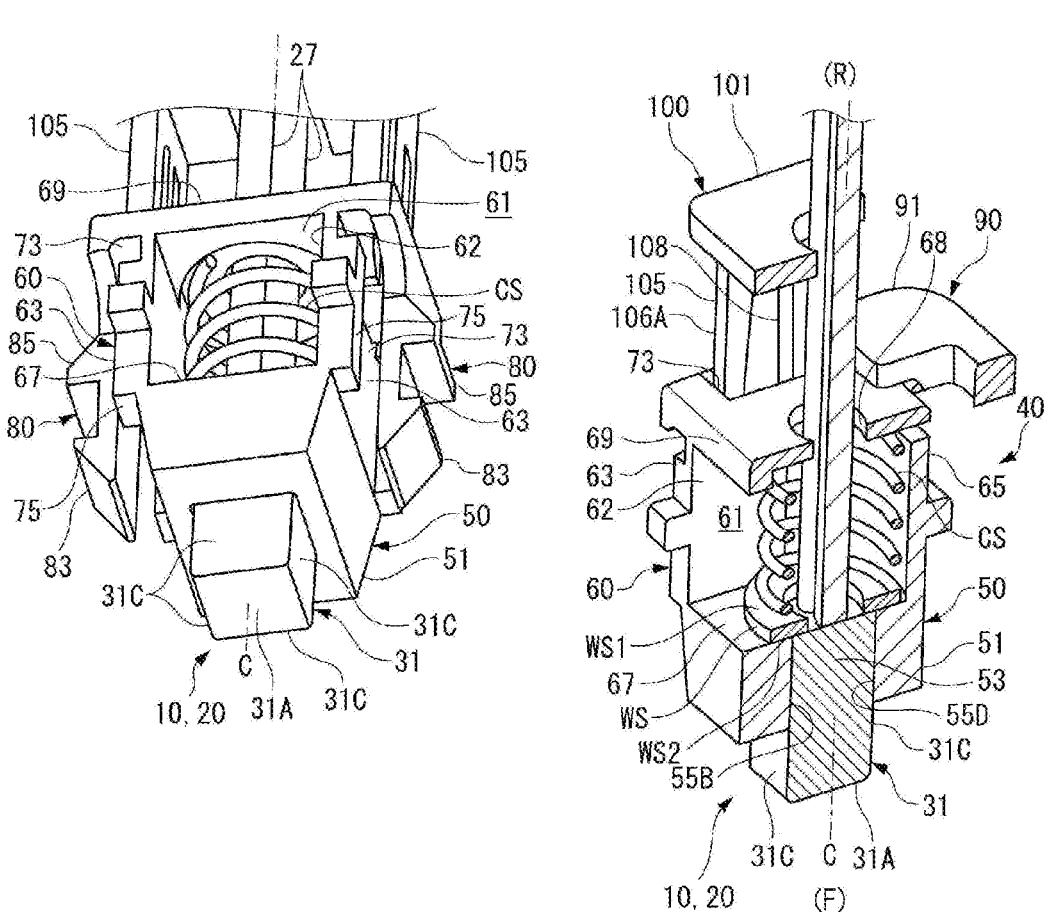
FIGS. 2A to 2C illustrate the temperature sensor according to the embodiment, where

[Locking Body 90: FIGS. 1B and 1C, FIG. 2B]

The locking body 90 alters the directions in which the lead wires 27 and 27 extend and includes a locking lever 91, a folding piece 93, and a locking groove 95.

The locking lever 91 is formed to extend from the upper wall 69 in a direction away from the insertion port 62, along the thickness direction (T). The locking lever 91 has an L shape in plan view. The folding piece 93 is curved from a tip of the locking lever 91 toward the accommodation portion 60. The locking groove 95 is a groove formed between the locking lever 91 and the folding piece 93. The pair of lead wires 27 and 27 are locked to the locking body 90 by being inserted through the locking groove 95.

When the pair of lead wires 27 and 27 are locked to the locking body 90, even when a tensile force X illustrated in FIG. 1B is applied to the pair of lead wires 27 and 27 in the thickness direction (T), the locking body 90 can receive this tensile force X. Therefore, the locking body 90 prevents the excessive tensile force X from being applied to the pair of lead wires 27 and 27, or even when the tensile force X is applied, it can be minimized. Further, since the protective tube 31 is held within the guide path 53 by locking the pair of lead wires 27 and 27 to the locking body 90, the protective tube 31 can be prevented from exiting the guide path 53 toward the front (F).

[Attachment Assurance Body 100: FIGS. 1A to 1C, FIG. 4, FIG. 5]

The attachment assurance body 100 is a (Position Assurance: PA) member that ensures that the temperature sensor 1 is attached to the attachment target 120 (FIG. 6) in a proper position. This attachment assurance body 100 is manufactured as a separate body from the holding unit 40 and is detachably attached to the holding unit 40. The temperature sensor 1 has the attachment assurance body 100 in addition to the holding unit 40, but the attachment assurance body 100 does not correspond to a configuration that holds the temperature measurement unit 10 allowing for reciprocating displacement. In other words, even when the attachment assurance body 100 is provided, it does not impair the effect of the present embodiment in which the temperature measurement unit 10 is held by a single member allowing for reciprocating displacement.

Figure 4:
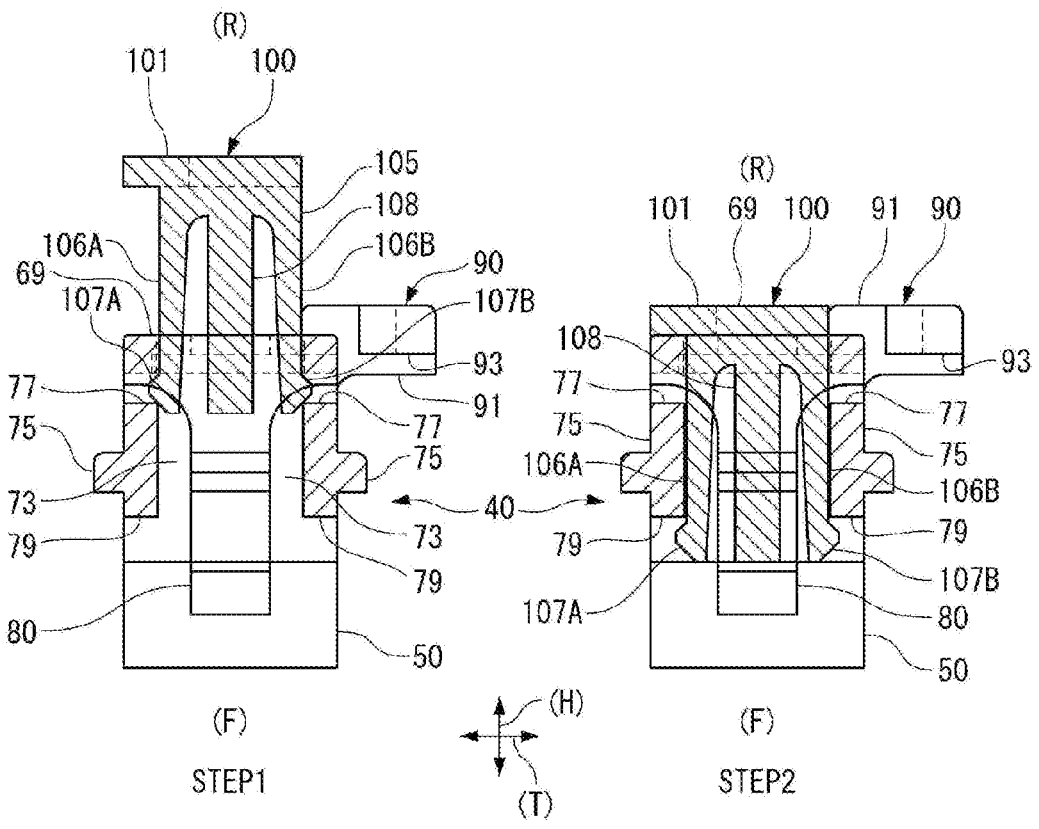
FIG. 4 illustrates an operation of an attachment assurance body according to the embodiment, where STEP1 illustrates a state in which the attachment assurance body is in a temporary locking position, and STEP2 illustrates a state in which the attachment assurance body moves to a final locking position.

The attachment assurance body 100 is in a temporary locking position illustrated in STEP1 of FIG. 4 until the temperature sensor 1 is attached to the attachment target 120, but after the temperature sensor 1 is attached to the attachment target 120, the attachment assurance body 100 is moved to a final locking position illustrated in STEP2 in FIG. 4. Assuming that a subject a who forms the temperature sensor 1 and a subject B who attaches the temperature sensor 1 to the attachment target 120 are different, and the attachment assurance body 100 is in the temporary locking position until the temperature sensor 1 is attached to the attachment target 120 by the subject B, and after attaching the temperature sensor 1 to the attachment target 120, the attachment assurance body 100 is moved to the final locking position. However, when the attachment of the temperature sensor 1 to the attachment target 120 is incomplete, the attachment assurance body 100 cannot move to the final locking position, and remains halfway between the temporary locking position and the final locking position. When the temperature sensor 1 is completely attached to the attachment target 120, the attachment assurance body 100 can move to the final locking position. This is the function of the attachment assurance body 100.

The attachment assurance body 100 includes a support plate 101 and a pair of attachment assurance arms 105 and 105 protruding toward the front (F) from both ends of the support plate 101 in the width direction (W). As a material for forming the attachment assurance body 100, a resin material is used as an example. The material of the attachment assurance body 100 is not limited to a resin material, and as long as a material has elasticity against external force it can be used. As another material used for the attachment assurance body 100, for example, a metal material may be used. When using a resin material, it can be integrally formed by injection molding, and when using a metal material, it can be integrally formed by stamping and bending a plate material.

As illustrated in FIG. 1C, the support plate 101 is a plate-shaped member having a U-shape in plan view. As will be described below, the support plate 101 is arranged at a predetermined distance from the upper wall 69 of the holding unit 40 when the attachment assurance body 100 is in the temporary locking position. Further, when the attachment assurance body 100 is in the final locking position, the support plate 101 is brought into contact with the upper wall 69, and further movement is restricted.

The attachment assurance arm 105 includes a pair of attachment assurance body locking arms 106A and 106B and a guide arm 108. The attachment assurance body locking arms 106A and 106B are respectively provided at both ends of the support plate 101 in the thickness direction (T), and the guide arm 108 is provided between them.

The attachment assurance body locking arms 106A and 106B, which are cantilevers, have fixed ends connected to the support plate 101, and each arm is formed to protrude toward the front (F). The guide arm 108 is formed between the attachment assurance body locking arms 106A and 106B in the thickness direction (T) and at a predetermined gap from each of the attachment assurance body locking arms 106A and 106B. Thus, by providing the predetermined gap between each of the attachment assurance body locking arms 106A and 106B and the guide arm 108, each of the attachment assurance body locking arms 106A and 106B can bend toward the guide arm 108.

As illustrated in FIG. 4, locking protrusions 107A and 107B are provided at front (F) end portions of the attachment assurance body locking arms 106A and 106B, which are free ends of the cantilevers. The locking protrusions 107A and 107B are formed so as to protrude in a direction away from the guide arm 108, that is, toward the outside of the thickness direction (T).

The guide arm 108 restricts the amount of movement of the attachment assurance arm 105 to the holding unit 40, and is formed substantially in the center between the attachment assurance body locking arms 106A and 106B in the thickness direction (T). The guide arm 108 is, for example, a rectangular member and is formed so as to protrude in the same direction as the attachment assurance body locking arms 106A and 106B. The dimensions of the guide arm 108 in a protrusion direction are set to have the same dimensions as that of the attachment assurance body locking arms 106A and 106B. Also, the dimensions of the guide arm 108 in the thickness direction (T) are appropriately set. However, the guide arm 108 is set to have dimensions such that the gap between the guide arm 108 and the attachment assurance body locking arms 106A and 106B is set such that they do not interfere with each other when the attachment assurance body locking arms 106A and 106B are bent.

[Operation of Attachment Assurance Body 100: FIG. 4]

When the attachment assurance body 100 is in the temporary locking position, the locking protrusions 107A and 107B are respectively fitted into temporary locking grooves 77 of the holding unit 40 as illustrated in STEP1 of FIG. 4. When the support plate 101 is pushed toward the front (F), the locking protrusions 107A and 107B come out of the temporary locking grooves 77, and then the attachment assurance body 100 moves toward the final locking position. Then, when the support plate 101 is further pushed down, the attachment assurance body 100 reaches the final locking position and the locking protrusions 107A and 107B respectively fit into locking grooves 79 as illustrated in STEP2. In this case, the support plate 101 is brought into contact with the upper wall 69, thereby restricting the movement of the attachment assurance body 100 beyond the final locking position.

Also, between the outer wall of the accommodation portion 60 and the locking arm 80, there is a gap toward the rear (R). When the attachment assurance body 100 moves from the temporary locking position toward the final locking position, the guide arm 108 is inserted through the gap between the holding unit 40 and the locking arm 80. This restricts the movement of the attachment assurance body 100 in the width direction (W).

As described above, the fact that the attachment assurance body 100 can move from the temporary locking position (STEP1 in FIG. 4) to the final locking position (STEP2 in FIG. 4) means mechanically or visually ensuring that the attachment of the temperature sensor 1 to the attachment target 120 has been completed. Further, even when an attempt is made to move the attachment assurance body 100 from the temporary locking position to the final locking position, if the attachment assurance body 100 cannot reach the final locking position and stops halfway, this means that the attachment of the temperature sensor 1 to the attachment target 120 is incomplete.

Figure 5:
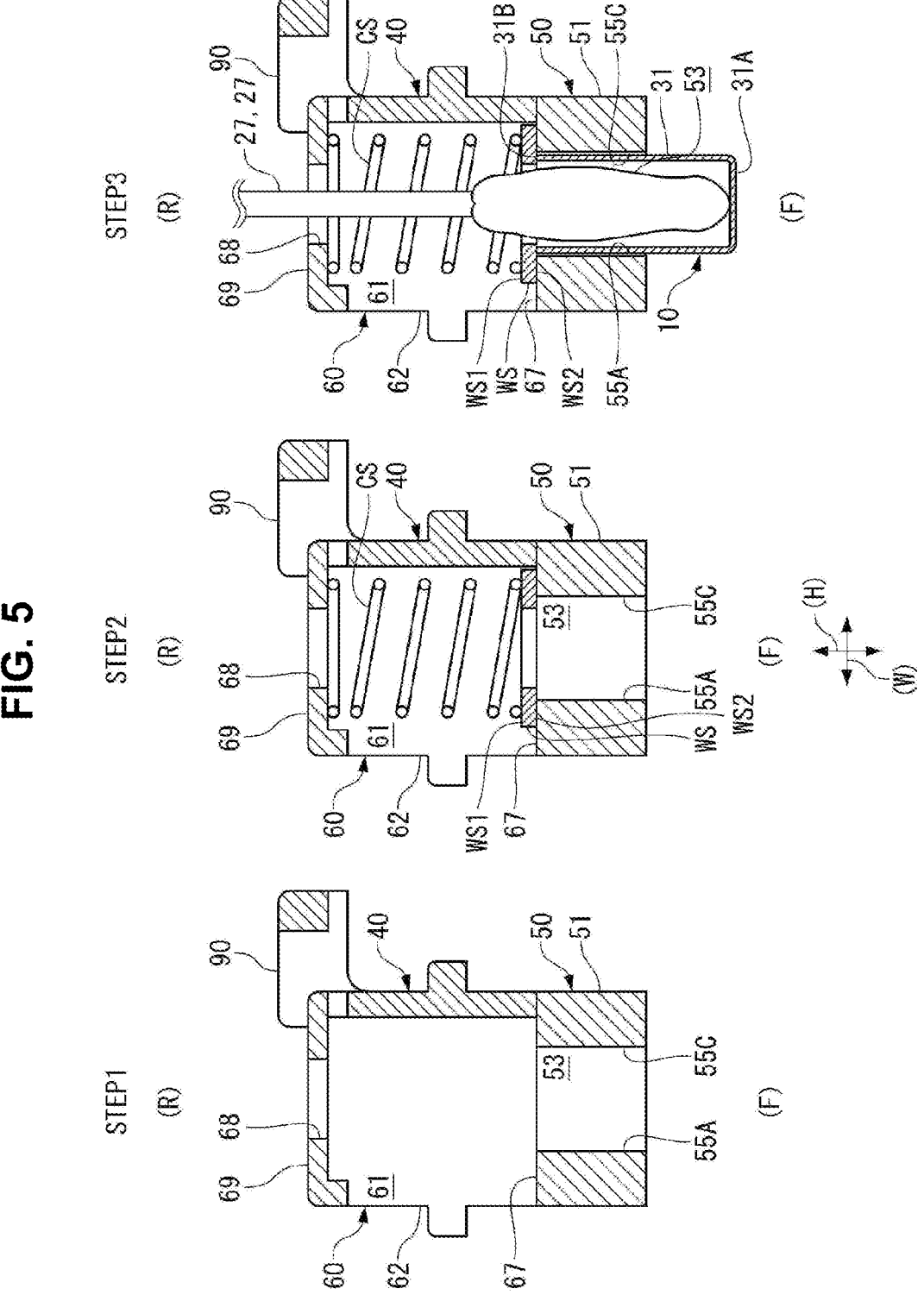
FIG. 5 is a diagram illustrating a procedure for producing the temperature sensor according to the embodiment, where STEP1 illustrates a holding portion before a temperature measuring portion and a compression coil spring are assembled, STEP2 illustrates a state after the compression coil spring is inserted into an accommodating portion of the holding portion, and STEP3 illustrates a state after the temperature measuring portion is attached to the holding section.

[Manufacturing Procedure of Temperature Sensor 1: FIG. 5]

A manufacturing procedure of the temperature sensor 1 will be described with reference to FIG. 5. This manufacturing procedure proceeds in the order of STEP1 to STEP4.

STEP1: Preparation of Holding Unit 40

The holding unit 40 as a single unit is prepared. The compression coil spring CS, the washer WS, and the temperature measurement unit 10 are not assembled in this holding unit 40, and the empty space 61 of the accommodation portion 60 is empty.

STEP2: Arrangement of Washer WS and Compression Coil Spring CS in Accommodation Portion 60

The washer WS is placed on the bottom wall 67 facing the accommodation portion 60, and then the compression coil spring CS is pushed from the insertion port 62 toward the empty space 61. The washer WS and the compression coil spring CS are arranged such that a part of the coating layer 29 and the lead wires 27 and 27 can pass through the guide path 53 of the bottom wall 67 and the lead wire insertion path 68 of the upper wall 69.

STEP3: Assembly of Temperature Measurement Unit 10

The temperature measurement unit 10 is assembled in the holding unit 40 in which the washer WS and the compression coil spring CS are installed in the accommodation portion 60. This assembly is performed such that the lead wires 27 and 27 are inserted into the guide path 53 from the front (F), and the lead wires 27 and 27 are pulled toward the rear (R) and simultaneously the protective tube 31 is pushed into the guide path 53 until the open end 31B of the protective tube 31 is brought into contact with the washer WS. Since the washer WS is pressed against the bottom wall 67 by the compression coil spring CS, when the open end 31B is brought into contact with the washer WS, resistance is received through the protective tube 31, such that the pushing of the protective tube 31 is stopped. Then, the lead wires 27 and 27 pulled out of the upper wall 69 are bent halfway and the lead wires 27 and 27 are locked to the locking body 90. The lead wires 27 and 27 are pulled out from the holding unit 40 through a central space of the compression coil spring CS. In other words, around the lead wires 27 and 27, there is a spirally wound wire forming the compression coil spring CS.

STEP4: Installation of Attachment Assurance Body 100

The attachment assurance body 100 is installed in the holding unit 40 in which the washer WS, the compression coil spring CS, and the temperature measurement unit 10 are assembled in the accommodation portion 60. For this installation, the attachment assurance arm 105 of the attachment assurance body 100 is inserted from the rear (R) of the holding unit 40. Specifically, the attachment assurance arms 105 of the attachment assurance body 100 are respectively inserted into the PA insertion paths 73 and 73 formed in the upper wall 69 of the holding unit 40 of the sensor 1. Afterward, when the support plate 101 of the attachment assurance body 100 is pushed down from the rear (R) to the front (F) side, the attachment assurance body locking arms 106A and 106B of the attachment assurance arms 105 and 105 bend inward in the thickness direction (T), that is, toward the guide arm 108 side, such the attachment assurance arms 105 and 105 are respectively inserted into the PA insertion paths 73 and 73. Afterward, when the support plate 101 of the attachment assurance body 100 is further pushed down to the front (F) side, the locking protrusions 107A and 107B formed on the tip side of the attachment assurance body locking arms 106A and 106B reach the positions of the temporary locking grooves 77. Then, the locking protrusions 107A and 107B are fitted into the temporary locking grooves 77, the attachment assurance body locking arms 106A and 106B in the bent states return to their original states, and the attachment assurance body 100 is fixed to the holding unit 40 at the temporary fixing position.

Figure 6:
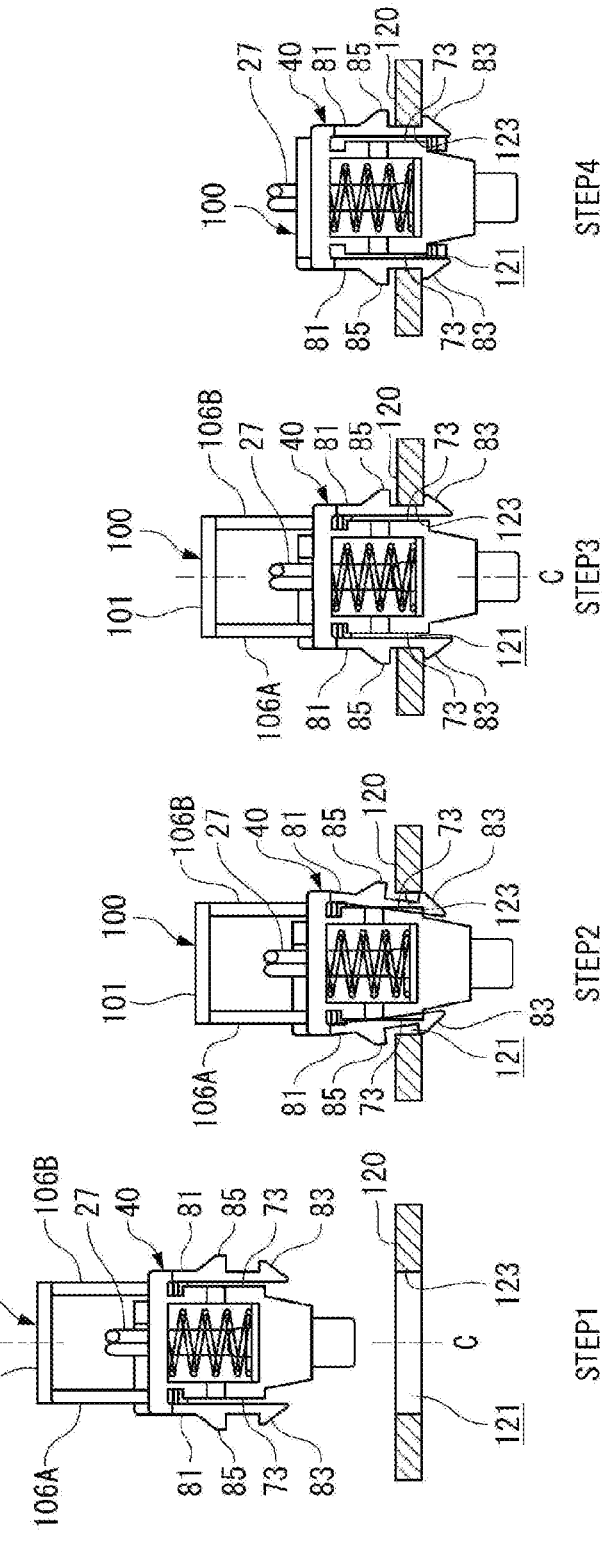
FIG. 6 is a diagram illustrating a procedure for attaching the temperature sensor according to the embodiment to an attachment target.

[Procedure for attaching Temperature Sensor 1 to Attachment Target 120: FIG. 6]

A procedure for attaching the temperature sensor 1 to the attachment target 120 will be described with reference to FIG. 6. This attachment procedure proceeds in order of STEP1, STEP2, STEP3, and STEP4.

STEP1: Positioning of Temperature Sensor 1 with respect to Attachment Target 120

The holding unit 40 to which the temperature measurement unit 10 and the attachment assurance body 100 are assembled is positioned with respect to a holding hole 121 of the attachment target 120. This positioning is performed such that the locking arm 80 of the holding unit 40 can be locked to a holding edge 123 surrounding the holding hole 121 in and after STEP2.

STEP2: Attaching Holding Unit 40 to Attachment Target 120 (Incompleted)

When the holding unit 40 in a positioned state is moved toward the holding hole 121, the first locking claws 83 and 83 of the locking arms 80 are brought into contact with the holding edge 123. When the holding unit 40 is pushed against the attachment target 120, the holding unit 40 is inserted into the holding hole 121 while the first locking claws 83 and 83 slide on the holding edge 123. In STEP2, the first locking claws 83 and 83 remain in the middle of the holding edge 123, indicating a half-insertion state.

This half-insertion state corresponds to incomplete attachment of the holding unit 40 to the attachment target 120, and the attachment assurance body 100 at the temporary locking position cannot be moved toward the final locking position. This is because the arms 81 and 81 of the locking arms 80 are bent inward in the width direction (W), the PA insertion paths 73 and 73 are narrowed, so the attachment assurance body locking arms 106A and 106B cannot be received in the PA insertion paths 73 and 73. This is the function of the attachment assurance body 100. When the attachment of the holding unit 40 is completed, the PA insertion paths 73 and 73 are in receivable states where the attachment assurance body locking arms 106A and 106B can enter the PA insertion paths 73 and 73, whereas when the attachment of the holding unit 40 is incomplete, the PA insertion paths 73 and 73 are in an unreceivable state where the attachment assurance body locking arms 106A and 106B cannot enter the PA insertion paths 73 and 73.

STEP3: Attaching Holding Unit 40 to Attachment Target 120 (Completed)

When the holding unit 40 is pushed in from a state in which the attachment is incomplete (the holding unit 40 is half-inserted into the attachment target 120), the first locking claws 83 and 83 get over the holding edge 123. Then, the arms 81 and 81 of the locking arms 80 which were bent return to their original states, and the holding edge 123 is pinched by the first locking claws 83 and 83 and the second locking claws 85 and 85, such that the attachment of the temperature sensor 1 to the attachment target 120 is completed. In the holding unit 40 in an attachment-completed state, the PA insertion paths 73 and 73 are in states where they can receive the attachment assurance body locking arms 106A and 106B. However, in this case, the attachment assurance body 100 is in the temporary locking position.

STEP4: Movement of Attachment Assurance Body 100 to Final Locking Position

When the attachment of the holding unit 40 is completed and the PA insertion paths 73 and 73 are ready to receive the locking arms 106A and 106B, the attachment assurance body locking arms 106A and 106B are pushed toward the PA insertion paths 73 and 73. When the holding unit 40 can be pushed in until the support plate 101 of the attachment assurance body 100 touches the upper wall 69, it can be confirmed that the temperature sensor 1 is completely fitted.

[Effects of Temperature Sensor 1]

The effects of the temperature sensor 1 will be described below.

[First Effect: Effect of Pulling Direction of Lead Wires 27 and 27]

In the temperature sensor 1, the sensor element 20 receives an elastic force from the compression coil spring CS through the protective tube 31 toward the front (F). Therefore, even when vibration occurs in the measurement target with which the heat-sensitive surface 31A of the protective tube 31 is in contact, the protective tube 31 of the sensor element 20 follows this vibration and continues to be in contact with the measurement object OM, thus ensuring that positional accuracy for the measurement object OM is easily achievable.

Moreover, in the temperature sensor 1, the lead wires 27 and 27 are locked by the locking body 90, such that the lead wires 27 and 27 are pulled out in the thickness direction (T). Therefore, even when a tensile force is applied to the lead wires 27 and 27 in this pulled-out direction, the locking body 90 will receive this force, so this tensile force is not applied to the protective tube 31 beyond the locking body 90, or even when it is applied, it can be minimized. This makes it easy to ensure the positional accuracy of the protective tube 31 with respect to the measurement object OM.

When it is assumed that the locking body 90 is not provided and the lead wires 27 and 27 are pulled out along the direction in which the protective tube 31 is displaced due to vibration, even when, for example, a tensile force is applied to the lead wires 27 and 27 in the direction in which they are pulled out, the protective tube 31 is displaced by this tensile force in the same direction as the direction in which the protective tube 31 is displaced by vibration, so it is possible to prevent the posture of the protective tube 31 from tilting with respect to the measurement object OM.

[Second Effect: Effect of Holding Unit 40 Composed of Only One Member]

In the temperature sensor 1, the holding unit 40 that accommodates and holds the temperature measurement unit 10, the compression coil spring CS, and the washer WS is composed of one member. When a member corresponding to this holding unit 40 composed of a plurality of members such as two members with dimensional tolerance, the tolerances of the two members are combined, resulting in less accurate positioning of the temperature measurement unit. On the other hand, when the holding unit 40 composed of only one member, the dimensional tolerance can be kept smaller than when it composed of a plurality of members, thus ensuring that the positional accuracy of the temperature measurement unit 10 is easily achievable.

Also, the holding unit 40 composed of only one member can reduce the manufacturing cost compared to the holding portion composed of a plurality of members.

[Third Effect: Lateral Insertion of Compression Coil Spring CS]

The temperature sensor 1 can insert the compression coil spring CS into the accommodation portion 60 from the insertion port 62 that is open in the thickness direction (T), that is, in a lateral direction (second direction). Accordingly, the holding unit 40 can be constructed with only one member. For example, in the case of a form in which the coil spring CS is inserted into the accommodation portion 60 along the height direction (H), at least two members are required. A member having the accommodation portion 60 and a lid-like member which closes the insertion port for the compression coil spring CS and against which one end side of the compression coil spring CS abuts.

Although the effect of configuring the holding unit 40 as one member is described as the second effect, the relationship with the compression coil spring CS is as follows.

When the holding unit 40 is composed of a plurality of members, the strength of a boundary portion between the members will be inferior, but when the holding unit 40 is composed of only one member, it is possible to avoid deterioration of the strength of the boundary portion. This enables the enhancement of the mechanical strength around the accommodation portion 60, especially in the height direction (H).

In addition, when a lid member is provided, it takes time and effort to attach the lid member, and if the lid member is not completely attached, the lid may come off. When the lid comes off, the compression coil spring CS can no longer be held, and there is a risk that the compression coil spring CS will come out of the accommodation portion 60. When the compression coil spring CS comes out of the accommodation portion 60, it no longer functions as the temperature sensor 1 during vibration.

In contrast to the above, in the case of the holding unit 40 composed of only one member, there is no lid to come off in the first place. Also in the temperature sensor 1, the compression coil spring CS may come out from the insertion port 62, but the compression coil spring CS surrounds the lead wires 27 and 27. Therefore, even when the compression coil spring CS tries to come out of the accommodation space 61 via the insertion port 62 due to a large vibration or the like, the lead wires 27 and 27 interfere with the compression coil spring CS, so the compression coil spring CS stays inside the space 61.

[Fourth Effect: Effect of Heat-Sensitive Surface 31A being Rectangular]

Figure 2C:
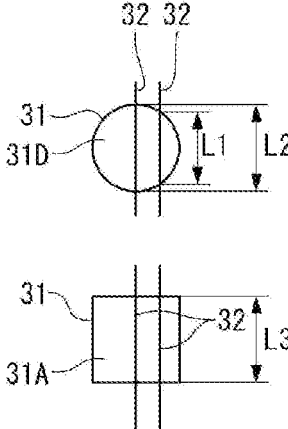

In the temperature sensor 1, the closed flat heat-sensitive surface 31A of the protective tube 31 is rectangular in a preferred form. The rectangular heat-sensitive surface 31A can suppress variations in contact area with the measurement object in the case of the measurement object OM having a cylindrical shape. That is, FIG. 2C illustrates a circular heat-sensitive surface 31D and a rectangular heat-sensitive surface 31A, and illustrates the areas of the measurement object OM in contact with the heat-sensitive surface 31D and the heat-sensitive surface 31A as line segments. In the case of the circular heat-sensitive surface 31D, the lengths L1 and L2 of the line segments differ depending on the relative position of the measurement object OM (line segment) with respect to the heat-sensitive surface 31D. On the other hand, in the case of the rectangular heat-sensitive surface 31A, the lengths L3 of the line segments in contact with the heat-sensitive surface 31A are the same regardless of the relative position of the measurement object OM with respect to the heat-sensitive surface 31A. When the lengths of contact with the heat-sensitive surface 31D are different, such as L1 and L2, the amount of heat received by the heat-sensitive surface 31D is also different, so the measured temperature tends to vary. On the other hand, when the lengths A of the line segments contacting the heat-sensitive surface 31A are the same, the amount of heat received by the heat-sensitive surface 31A is also the same. As a result, variation in the measured temperature is less likely to occur. Therefore, according to the present embodiment, even when the protective tube 31 is displaced in the width direction (W), it is possible to suppress variations in the measured temperature. Equalizing the contact area with the measurement object OM in this manner is not limited to the flat rectangular surface of the heat-sensitive surface 31A. Other forms can be employed, for example a heat-sensitive surface with an arcuate surface. Also, when the material forming the heat-sensitive surface 31A has flexibility, even when the measurement object OM is misaligned, the contact area can be kept the same. Examples of this material include an elastomer resin.

Corresponding to the rectangular heat-sensitive surface 31A, the protective tube 31 has a rectangular tube shape and is guided by the rectangular tube shaped guide path 53. Therefore, since the protective tube 31 is restricted from being displaced around its axis line, there is no possibility that the lead wires 27 and 27 connected to the protective tube 31 will be twisted. This effect can also be obtained in other prisms having at least one or more planes on the guide surface 31C, such as a triangular prism, a pentagonal prism, and a semi-cylindrical prism.

[Fifth Effect: Effect of Attachment Assurance Body 100]

As a preferred form in the temperature sensor 1, the attachment assurance body 100 is provided in the holding unit 40. When this attachment assurance body 100 can move from the temporary locking position to the final locking position, it ensures that the holding unit 40 of the temperature sensor 1 is completely attached to the attachment target 120. When the attachment assurance body 100 cannot move from the temporary locking position to the final locking position, it can be recognized that the attachment of the holding unit 40 of the temperature sensor 1 to the attachment target 120 has not been completed. In this way, the temperature sensor 1 having the attachment assurance body 100 can make it possible to easily distinguish complete or incomplete attachment to the attachment target 120.

When an attempt to measure the temperature of the measurement object OM is made by bringing the temperature sensor 1 in contact with the measurement object OM, if the temperature sensor 1 is not securely attached to the attachment target 120, contact with the measurement target OM may become unreliable. Therefore, according to the temperature sensor 1 having the attachment assurance body 100, even when vibration or the like is applied to the measurement object OM or the like, the temperature sensor 1 can maintain contact with the attachment target 120 without falling off from the attachment target 120. It can be said that t this ensures that the temperature measurement of the measurement object OM can be stably performed.

Although the preferred embodiment of the present invention is described above, the configurations listed in the above-described embodiment can be selected or replaced with other configurations without departing from the gist of the present invention.

For example, the attachment assurance body 100 can be omitted, and the attachment assurance body 100 can be replaced with an attachment assurance body 110 according to a modification example. The attachment assurance body 110 will be described with reference to FIGS. 7A and 7B.

Figures 7A, 7B:
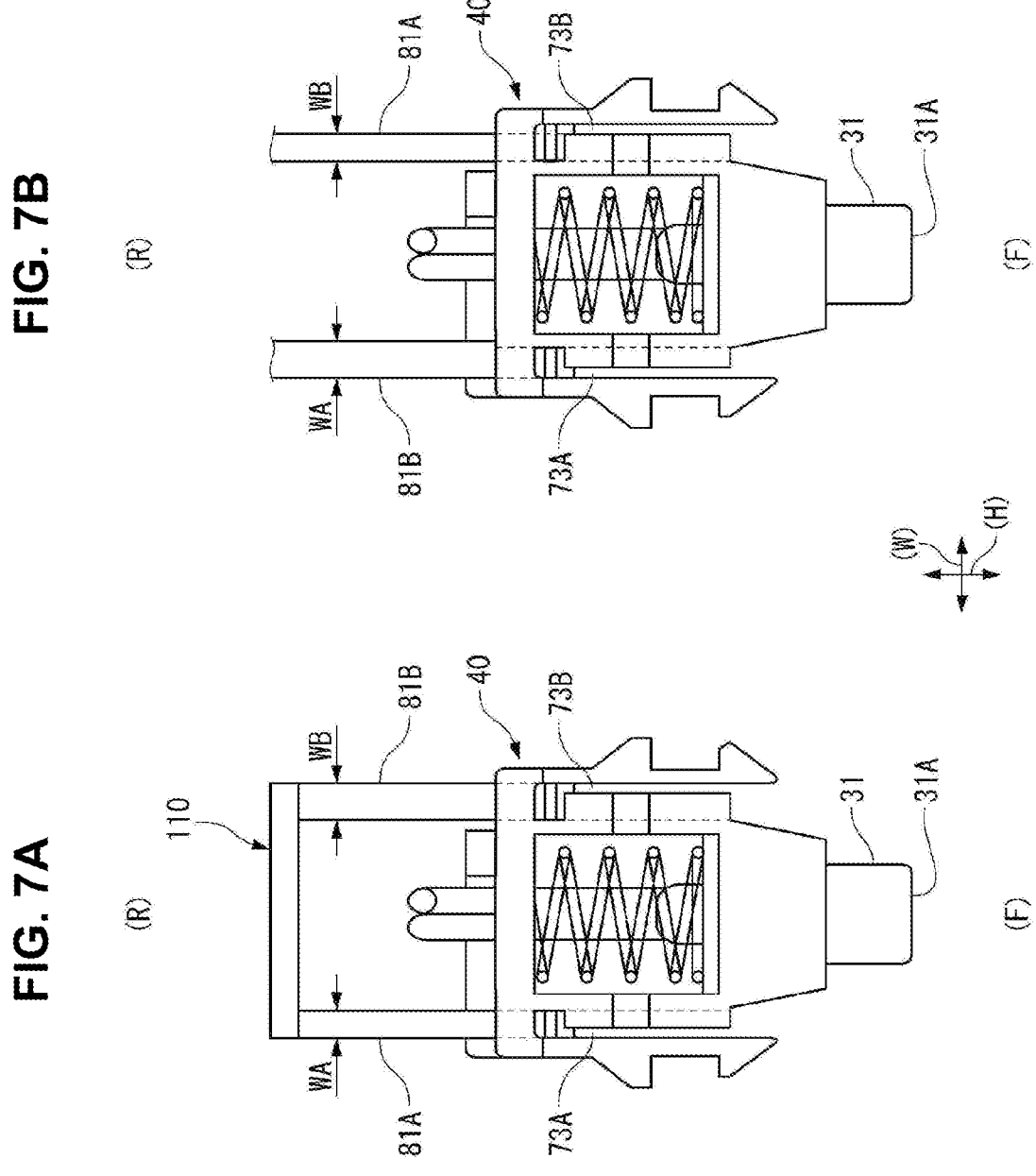
FIGS. 7A and 7B are diagrams illustrating a modification example of the attachment assurance body.

The attachment assurance body 110 according to the modification example differs from the attachment assurance body 100 in that widthwise (W) dimensions WA and WB of a pair of arms 81A and 81B of the locking arms 80 are different. As an example, as illustrated in FIG. 7A, the arm 81B has a larger dimension than the arm 81A. The dimensions of the pair of arms 81, 81 of the attachment assurance body 100 are equal. The different widthwise (W) dimensions of the arms 81A and 81B prevent the attachment assurance body 110 from being assembled to the holding unit 40 in the wrong orientation. This function for preventing assembly in the wrong direction is achieved by making the dimensions of PA insertion paths 73A and 73B into which the arms 81A and 81B are inserted correspond to the dimensions of the arms 81A and 81B, and making the dimension of the PA insertion path 73B larger than that of the PA insertion path 73A.

It is assumed that the dimensions of the arms 81A and 81B and the dimensions of the PA insertion paths 73A and 73B are set as described above. Then, as illustrated in FIG. 7B, an attachment assurance body 110 is attached to the holding part 40 in the wrong opposite orientation, with the arm 81A corresponding to the PA insertion path 73B and the arm 81B corresponding to the PA insertion path 73A. However, since the arm 81B cannot be inserted into the PA insertion path 73A, misassembly of the attachment assurance body 110 is prevented.

<div align="center">REFERENCE SIGNS LIST</div>

1 temperature sensor
10 temperature measurement unit
20 sensor element
21 heat-sensitive body
23 protective layer
25 extension wire
27 lead wire
27A core wire
27B insulation coating
29 coating layer
31 protective tube
31A heat-sensitive surface
31B open end
31C guide surface
31D heat-sensitive surface
33 filler
40 holding portion
50 guide
51 guide block
53 guide path
55 guide surface
60 accommodation portion
61 accommodation space
62 insertion port
63 first side wall
65 second side wall
67 bottom wall
68 lead wire insertion path
69 upper wall
73, 73A, 73B PA insertion path
75 PA guide portion
77 temporary locking groove
79 final locking groove
80 locking arm
81, 81A, 81B arm
83 first locking claw
85 second locking claw
90 locking body
91 locking lever
93 folding piece
95 locking groove
100 attachment assurance body
101 support plate
105 attachment assurance arm
106A and 106B attachment assurance body locking arm
107A and 107B locking protrusion 108 guide arm
110 attachment assurance body
120 attachment target
121 holding hole
123 holding edge
OM measurement object
WS washer

The invention claimed is:

1. A temperature sensor comprising:
a temperature measurement unit that is configured to measure a temperature of a measurement object, the temperature measurement unit having a heat-sensitive body and a pair of electric wires electrically connected to the heat-sensitive body;
a holding portion that holds the temperature measurement unit and is composed of a single member; and
an elastic portion that applies an elastic force to the temperature measurement unit toward the measurement object, the elastic portion being provided between the temperature measurement unit and the holding portion, wherein
the electric wires of the temperature measurement unit are pulled out from the holding portion along a first direction in which the elastic force is applied, wherein
the holding portion includes an accommodation portion that accommodates the elastic portion and opens in a second direction that intersects the first direction in which the elastic force is applied, wherein
the elastic portion is composed of a compression coil spring, and wherein
the electric wires are pulled out from the holding portion through a central empty space of the compression coil spring.

2. The temperature sensor according to claim 1, wherein the holding portion includes a locking body that locks the electric wires.

3. The temperature sensor according to claim 1, wherein the holding portion includes a guide that is configured to guide a displacement of the temperature measurement unit due to a vibration of the measurement object.

4. The temperature sensor according to claim 1, wherein the holding portion includes an attachment assurance body that ensures completion of attachment to the measurement object.

5. The temperature sensor according to claim 1, wherein the temperature measurement unit includes a protective tube that accommodates the heat-sensitive body and has a heat-sensitive surface in contact with the measurement object.

6. The temperature sensor according to claim 5, wherein the protective tube has a rectangular tube shape.

* * * * *